United States Patent [19]
Costemalle et al.

[11] Patent Number: 5,631,316
[45] Date of Patent: May 20, 1997

[54] TIRE INNERLINER COMPRISING ESTER-FUNCTIONALIZED ELASTOMERIC INTERPOLYMERS OF C4-C7 ISOMONOOLEFIN AND PARA-ALKYLSTYRENE

[75] Inventors: Bernard J. Costemalle, Rhode St Genese, Belgium; James V. Fusco, Red Bank, N.J.; Pierre T. Hous, Steenokkerzeel, Belgium; Hsien-Chang Wang, Bellaire, Tex.

[73] Assignee: Exxon Chemical Patents Inc., Wilmington, Del.

[21] Appl. No.: 472,373

[22] Filed: Jun. 7, 1995

Related U.S. Application Data

[63] Continuation-in-part of Ser. No. 305,547, Sep. 14, 1994, Pat. No. 5,473,017, which is a continuation-in-part of Ser. No. 129,292, Sep. 30, 1993, abandoned.

[51] Int. Cl.⁶ .................... C08L 25/16; C08K 3/04
[52] U.S. Cl. .................. 524/521; 524/495; 524/525; 524/578; 525/193; 525/232; 525/233; 525/333.3; 525/333.5; 525/372; 525/912; 522/149; 156/123; 156/273.3; 156/275.5; 156/307.1; 152/450; 152/510
[58] Field of Search .................. 524/495, 576, 524/578, 521, 525; 525/193, 241, 333.3, 333.5, 232, 233, 372, 912; 522/149; 152/510, 511, 450; 156/123, 273.3, 275.5, 307.1

[56] References Cited

U.S. PATENT DOCUMENTS

| | | |
|---|---|---|
| 2,943,664 | 7/1960 | Baldwin et al. |
| 5,162,445 | 11/1992 | Powers et al. ............... 525/333.4 |
| 5,376,503 | 12/1994 | Audett et al. ............... 430/270 |
| 5,473,017 | 12/1995 | Wang ............... 525/193 |

FOREIGN PATENT DOCUMENTS

WO91/04986A1  4/1991  WIPO.

OTHER PUBLICATIONS

Kruse et al, "Industrial Rubber Applications Development . . . ", ACS Rubber Div. Meeting Nov. 3, 1992.

Fusco et al, "Butyl and Halobutyl Rubbers", Rubber Technology, Van Nostrand Reinhold, N.Y., 316–318 (1987).

*Primary Examiner*—Fred Teskin
*Attorney, Agent, or Firm*—Myron B. Kurtzman

[57] ABSTRACT

Vulcanizable tire innerliner compositions are described which are essentially free of halogen atoms or contain a reduced halogen content. The innerliners contain a saturated elastomeric interpolymer of a $C_4$–$C_7$ isomonoolefin, e.g., isobutylene and a para-alkylstyrene e.g., para-methylstyrene, which contains benzylic ester functionality having the structure:

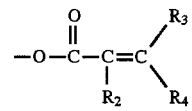

wherein $R_2$ and $R_3$ are independently selected from hydrogen or $C_1$ to $C_6$ alkyl, and $R_4$ is selected from hydrogen, $C_1$ to $C_{28}$ alkyl, aryl or $C_2$ to $C_{28}$ alkenyl.

Innerliners of the invention provide excellent impermeability to air, heat aging properties and good adhesion to tire carcass stock required for tire innerliners, and are also essentially free of halogen or contain low halogen content thereby reducing environmental concerns occasioned by the incineration of used tires.

18 Claims, No Drawings

TIRE INNERLINER COMPRISING ESTER-FUNCTIONALIZED ELASTOMERIC INTERPOLYMERS OF C4-C7 ISOMONOOLEFIN AND PARA-ALKYLSTYRENE

This application is a Continuation-in-Part application of Ser. No. 305,547, filed Sep. 14, 1994, and now U.S. Pat. No. 5,473,017, issued Dec. 5, 1995, which in turn is a Continuation-in-Part of Ser. No. 129,292, filed Sep. 30, 1993, and now abandoned.

BACKGROUND OF THE INVENTION

1. Field of the Invention

The invention relates to tire innerliner compositions and vulcanized innerliners made therefrom used as air impermeable layers in the construction of pneumatic tires.

2. Description of Related Art

Butyl rubber, i.e., elastomeric copolymers of isobutylene with up to about 10 wt % of isoprene, possesses excellent resistance to air permeability and good aging properties which render it quite suitable for use as tire inner tubes or innerliner material for the production of tubeless pneumatic tires. The innerliner is composed of a relatively thin sheet of the elastomer formulated with compounding additives and a curing system, which is laminated to the inner surface of a tire carcass layer of an uncured tire as the tire is formed on a tire building drum. Final cure of the composite structure produces a tire having a cured innerliner adhered to the carcass which serves as a barrier to the passage of compressed air through the tire.

Halogenated butyl rubber normally containing from about 0.5 to 3 wt % halogen, e.g., bromine or chlorine, has proven to be a more effective innerliner material because the halogenated polymer exhibits improved adhesion to the tire carcass material and facilitates tire assembly. The halogenated material can be formulated with a curative system, e.g., zinc oxide/sulfur curing agents, which contribute to the development of interfacial crosslinking between the surface of the innerliner layer and the surface of the adjacent carcass layer which normally contains a more highly unsaturated rubber, thereby enhancing adhesion of the innerliner to the carcass. The use of halogenated butyl rubber for tire innerliners is disclosed in U.S. Pat. No. 2,943,664, as well as numerous other patents.

More recently, a new class of halogenated $C_4$-$C_7$ isomonoolefin elastomers have been developed which demonstrate superior heat aging and flex properties as compared with halogenated butyl rubber. These polymers comprise random interpolymers of $C_4$-$C_7$ isomonoolefin, such as isobutylene, with up to about 20 wt % of a para-alkylstyrene, such as para-methylstyrene, containing from about 0.1 to about 5 mole % of halomethylstyrene groups, e.g., bromomethylstyrene groups. These materials are more resistant to heat aging because they are free of olefinic unsaturation and yet they provide the good resistance to air permeability, flex resistance, tensile strength elongation and adhesion properties desired for tire innerliner applications. These polymers may also be cured by facile crosslinking reactions involving the benzylic halogen atom using zinc oxide/sulfur curing systems similar to those used to cure halogenated butyl rubber. These halogenated polymers are further described in U.S. Pat. No. 5,162,445, and compositions containing these polymers used for the fabrication of tire innerliners are disclosed in PCT published application WO-A-92 01575.

There has developed increased concern in recent years that the disposal of worn out tires by incineration may lead to the development of toxic, halogen-containing gas by-products as the result of thermal decomposition of the innerliner component of such tires. This concern, whether real or unfounded, has led tire manufacturers to seek tire construction components which are essentially free of halogen or have at least a reduced halogen content. In the case of tire innerliner materials, this requires the provision of elastomeric materials which, on the one hand, possess good air impermeability, heat flex, heat aging and tire carcass adhesion properties and which, on the other hand, are also essentially free of halogen or at least contain a significantly reduced halogen content.

SUMMARY OF THE INVENTION

The present invention provides tire innerliner compositions and vulcanized innerliners prepared therefrom which are essentially free of halogen or contain a substantially reduced halogen content and which at the same time exhibit excellent air impermeability, heat aging, heat flex and carcass adhesion properties. These compositions comprise a mixture of:

(i) from about 40 to 80 weight percent of an elastomeric random interpolymer comprising at least about 80 wt % of a polymerized isomonoolefin containing from 4 to 7 carbon atoms and from about 0.05 up to about 20 wt % of copolymerized aromatic monomer units comprising a mixture of the following randomly distributed therein:

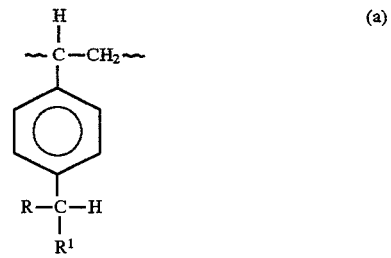

(a)

and

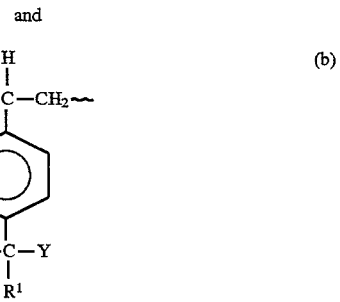

(b)

wherein R and $R^1$ are independently selected from the group consisting of hydrogen and $C_1$ to $C_4$ alkyl and Y comprises an ester group having the structure:

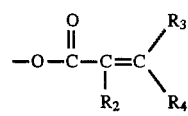

wherein $R_2$ and $R_3$ are independently selected from the group consisting of hydrogen and an alkyl group containing 1 to about 6 carbon atoms and $R_4$ is selected from the group consisting of hydrogen, an alkyl group containing from 1 to about 28 carbon atoms, an aryl group and an alkenyl group containing from 2 to about 28 carbon atoms;

ii) from about 20 to about 45 wt % of a filler, iii) from 0 to about 25 wt % of a plasticizer oil; and iv) at least 1 wt % of a curing system for said interpolymer.

The invention also provides a method of fabricating a pneumatic tire comprising forming the composition described above into an innerliner sheet material, exposing the sheet material to a source of high energy radiation sufficient to partially cure the sheet material, contacting the partially cured innerliner with a tire carcass element containing a more highly unsaturated rubber to form a laminate structure and heating the resulting structure at a temperature of about 100° C. to 250° C. for a period of time sufficient to vulcanize the structure.

DETAILED DESCRIPTION OF THE INVENTION

The benzylic ester-functionalized interpolymer of a $C_4$ to $C_7$ isomonoolefin and a para-alkylstyrene may be prepared by reacting a precursor halogenated copolymer of a $C_4$ to $C_7$ isoolefin, as described below, with a nucleophilic reagent having the formula:

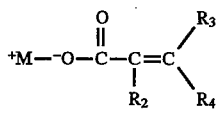

wherein M is hydrogen, a metal ion or an onium ion and $R_2$, $R_3$ and $R_4$ are as described in the summary section above, under reaction conditions such that at least a portion, and preferably substantially all, of the benzylic halide atoms present in the halogenated copolymer structure are displaced via a nucleophilic substitution reaction and replaced with the corresponding ester group. In the formula above, $R_2$ is preferably hydrogen or methyl, $R_3$ is preferably hydrogen and $R_4$ is preferably hydrogen or $C_3$ to $C_{12}$ alkenyl, most preferably hydrogen.

The halogenated $C_4$–$C_7$ isoolefin/para-alkylstyrene precursor interpolymers are the halogenation product of random copolymers of a $C_4$ to $C_7$ isoolefin, such as isobutylene, and a para-alkyl styrene comonomer, preferably para-methylstyrene, containing at least about 80%, more preferably at least about 90% by weight of the para isomer, and wherein at least some of the alkyl substituent groups present in the styrene monomer units contain halogen. Preferred materials may be characterized as isobutylene interpolymers containing the following monomer units randomly spaced along the polymer chain:

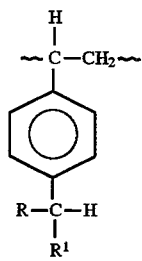

and

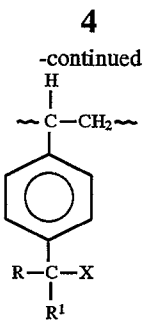

wherein R and $R^1$ are independently hydrogen, lower alkyl, preferably $C_1$ to $C_4$ alkyl, and X is bromine or chlorine, and wherein the interpolymer is otherwise substantially free of ring halogen or halogen in the polymer backbone chain. Preferably R and R' are each hydrogen. Up to about 60 mole % of the para-alkylstyrene present in the interpolymer structure may be the halogenated structure (2) above.

Most useful of such material are elastomeric copolymers of isobutylene and para-methylstyrene containing from about 0.5 to about 20 mole % para-methylstyrene wherein up to about 60 mole % of the methyl substituent groups present on the benzyl ring contain a bromine or chlorine atom, preferably a bromine atom. These copolymers have a substantially homogenous compositional distribution such that at least 95% by weight of the polymer has a para-alkylstyrene content within 10% of the average para-alkylstyrene content of the polymer. They are also characterized by a very narrow molecular weight distribution (Mw/Mn) of less than about 7, more preferably less than about 5, a preferred viscosity average molecular weight in the range of from about 300,000 up to about 2,000,000, and a preferred number average molecular weight in the range of from about 25,000 to about 1,000,000, as determined by Gel Permeation Chromotgraphy.

The copolymers may be prepared by slurry polymerization of the monomer mixture using a Lewis Acid catalyst, followed by halogenation, preferably bromination, in solution in the presence of halogen and radical initiator such as heat and/or light and/or a chemical initiator.

Preferred brominated copolymers generally contain from about 0.1 to about 5 mole % of bromomethyl groups, most of which is monobromomethyl, with less than 0.05 mole % dibromomethyl substituents present in the copolymer. These copolymers, their method of preparation, their method of cure and graft or functionalized polymers derived therefrom are more particularly disclosed in U.S. Pat. No. 5,162,445, the complete disclosure of which is incorporated herein by reference. The acrylic and methacrylic ester functionalized derivatives of these copolymers are particularly disclosed in Examples 112 F-1 and 112 F-2 of this patent.

The nucleophilic substitution reaction described above is preferably conducted in solution using a solvent system which will dissolve the halogenated isoolefin/para-alkylstyrene precursor copolymer and provide a solution or dispersion of both the polymer and nucleophilic reagent so as to achieve intimate contact between the benzylic halogen of the precursor polymer and the nucleophile. Suitable solvents include benzene, toluene, alkanes such as heptane, hexane, and cyclohexane and oxygen-containing solvents or solvent mixtures such as tetrahydrofuran or mixtures thereof with lower alcohols.

The reaction is preferably conducted under mild reaction conditions so as to avoid the formation of crosslinked or gelled products and minimize unwanted side reactions. Preferred reaction temperatures range from about 20° to 100° C. The formation of the desired reaction product is facilitated under mild reaction conditions by utilizing the onium salt of the nucleophilic agent as a reactant, i.e., the tetrabutyl ammonium salt.

Acids which may be used to form the nucleophile are those which contain ethylenic unsaturation conjugated with the carbonyl group, e.g., acrylic acid, methacrylic acid, sorbic acid, cinnamic acid and the like, as well as mixtures thereof. The resulting reaction product may be characterized as a random interpolymer comprising at least about 80 weight % of polymerized isoolefin containing 4 to 7 carbon atoms and from about 0.05 up to about 20 weight % or aromatic monomer units comprising a mixture of the following structure randomly distributed therein:

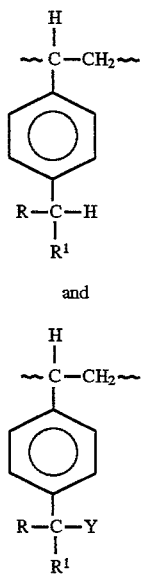

wherein R and $R^1$ are independently selected from the group consisting of hydrogen and $C_1$ to $C_4$ alkyl and Y is as defined above. Preferably R and $R^1$ is as defined above hydrogen.

The more preferred ester-functionalized interpolymer products of this invention generally contain from about 0.05 to 10 mole % of monomer units defined by (b) above, more preferably from about 0.1 to 5 mole % of such units. The nucleophilic displacement reaction may be conducted under conditions wherein essentially all, e.g., greater than 99% of the benzylic halogen atoms present in the precursor interpolymer, are displaced with the nucleophile. The resulting functionalized interpolymer derivatives may therefore be characterized as essentially halogen free or of reduced halogen content.

Where all halogens present in the polymer are essentially completely displaced, the resulting product is a terpolymer. The more preferred materials are terpolymers containing at least about 95 mole % of polymerized isobutylene and the balance a mixture of predominantly para-methylstyrene and less predominantly 4-(acryloyloxy-methyl) styrene, 4-(methacryloyloxy-methyl) styrene, 4-(cinnamoyloxy-methyl) styrene or 4-(2,4-hexandienoyloxy-methyl) styrene.

Small quantities of stabilizing nucleophilic agents such as 4-hydroxy-benzophenone may also be present as a reactive component in the nucleophilic reaction media. These agents will also replace some halogen under reaction conditions to provide benzylic benzophenone ether linkages along the polymer chain, which tend to provide enhanced stability of the polymer towards oxidative degradation. The quantity of reacted benzophenone may generally constitute from about 0.05 to 0.25 mole % of the polymer.

The tire innerliner composition of the invention may also contain other ingredients used in tire innerliners such as filler, plasticizer oil (processing oil) and curing agents. The composition may optionally also contain one or a mixture of more highly unsaturated rubbers which tends to further enhance the bonding between the surfaces of the tire innerliner and the tire carcass.

Suitable filler materials include carbon black such as channel black, furnace black, thermal black, acetylene black, lamp black and the like. Reinforcing grade carbon black is most preferred. The filler may also include non-reinforcing materials such as silica, clay, calcium carbonate, talc, titanium dioxide and the like. The filler is normally present in the innerliner at a level of from about 20 to about 45% by weight of the total composition, more preferably from about 25 to 40% by weight.

Suitable plasticizer oils include aliphatic acid esters or hydrocarbon plasticizer oils such as paraffinic or naphthenic petroleum oils. The preferred plasticizer oil is a paraffinic petroleum oil. Suitable hydrocarbon plasticizer oils include oils having the following general characteristics.

| Property | Preferred | Minimum | Maximum |
| --- | --- | --- | --- |
| API gravity at 60° F. (15.5° C.) | 15–30 | 10 | 35 |
| Flash Point, °F. (open cup method) | 330–450 (165–232° C.) | 300 (148° C.) | 700 (371° C.) |
| Pour Point, °F. | 30 to +30 (−34 to −1° C.) | −35 (−37° C.) | 60 (15° C.) |
| SSU at 100° F. (38° C.) | 100–7,000 | 50 | 20,000 |

The oil is an optional component and is present in the composition at a level of 0 to about 25 wt %, more preferably from about 5 to 20 wt % of the total composition.

Curing systems which may be used to cure the innerliner composition include suitable organic peroxides, zinc oxide and accelerated sulfur-containing vulcanization systems.

Examples of suitable peroxides include dialkyl peroxides, ketal peroxides, aralkylperoxides, peroxyethers and peroxyesters. Preferred peroxides include di-cumylperoxide, di-tert-butylperoxide, benzoyl peroxide, tert-butylperbenzoate, dimethyl di t-butyl peroxy hexane and like known free radical generators. The quantity of peroxide generally ranges from about 1 to about 10% by weight, preferably from about 1.5 to 6% by weight per hundred parts by weight of curable polymer present in the composition.

Accelerated sulfur vulcanization systems which may be used as curatives in the present invention include sulfur or mixtures of sulfur and sulfur-containing accelerators and/or phenol-formaldehyde resins. Suitable accelerators include benzothiazyl disulfides, N-oxydiethylene benzothiazole-2-sulfenamide, 2-mercaptobenzothiazole, alkyl phenol disulfides, alkyl-thiuram sulfides, m-phenylenebismaleimide, $N,N^1$-diarylguanidines, dialkyl and diaryldithiocarbamates, and like materials.

Suitable dialkyldithiocarbamates include the dialkyldithiocarbamates of zinc, bismuth, cadmium, copper, lead, selenium, and tellurium wherein the alkyl group contains from 1 to 5 carbon atoms, piperidinium pentamethylene-dithiocarbamate and mixtures thereof.

Suitable diarylthiocarbamates include the diaryldithiocarbamates of zinc, bismuth, cadmium, copper, lead, selenium, tellurium, and mixtures thereof.

Suitable alkyl thiuram sulfides include dipentamethylene thiuram tetrasulfide, tetrabutylthiuram disulfide, tetraethylthiuram disulfide, tetramethylthiuram monosulfide, tetrabenzyl thiuram disulfide, and mixtures thereof.

Sulfur and vulcanization accelerators are normally added to the composition at levels in the range of from about 0.5 to about 8% by weight, based on the weight of elastomer present in the composition.

The accelerated sulfur curing system is preferably used as a cocurative in curing systems also containing zinc oxide or an equivalent thereof, as an auxiliary curative agent. Zinc oxide is normally used in such systems at a level of from about 0.2 to about 7 parts by weight per 100 parts by weight of elastomer. The present invention provides for particularly good low cure reversion where zinc oxide is present at levels in the range of from about 0.5 to about 5.0 parts by weight per 100 parts by weight of elastomer.

A particularly preferred curing system comprises one or a mixture of organic peroxides used in conjunction with zinc oxide or a mixture of zinc oxide, sulfur and 2,2'-mercaptobenzothiazyl disulfide (MBTS) cure accelerator.

The curatives are normally added to the composition at levels of from about 1 to about 10 wt %, based on the elastomer content of the composition.

The composition may also be cured or partially cured using a source of high energy radiation as further described below.

Suitable more high unsaturated rubbers which may be blended with the functionalized interpolymer include natural rubber, butyl rubber, halogenated butyl rubber, synthetic polyisoprene, polybutadiene, copolymers of butadiene with up to about 35 wt % of styrene or acrylonitrile, and mixtures thereof. These elastomers, when present, may constitute up to 50 wt %, more preferably from about 5 to 30 wt %, of the content of rubber present in the composition.

The elastomeric functionalized interpolymer or blend thereof with one or more highly unsaturated rubbers will normally constitute from about 40 to 80 wt %, more preferably from about 40 to 70 wt % and most preferably from about 45 to 65 wt % of the total innerliner composition.

The composition may also contain other rubber compounding additives known in the art including tackifiers, antioxidants, stabilizers, rubber processing additives, pigments and mixtures thereof. Suitable antioxidants include hindered phenols, amino phenols, hydroquinones, certain amine condensation products and the like. The preferred processing additives are fatty acids, low molecular weight polyethylene, waxes and mixtures thereof. A preferred fatty acid is stearic acid. Mixtures of other fatty acids can be used with the stearic acid. Suitable tackifiers include petroleum resins, coumarone—indene resins, terpene-phenol resins and xylene/formaldehyde resins.

The tire innerliner composition may be prepared by using conventional mixing techniques including, e.g., kneading, roller milling, extruder mixing, internal mixing (such as with a Banbury® mixer) etc. The sequence of mixing and temperatures employed are well known to the skilled rubber compounder, the objective being the dispersion of fillers, activators and curatives in the polymer matrix without excessive heat buildup. A useful mixing procedure utilizes a Banbury mixer in which the copolymer rubber, carbon black and plasticizer are added and the composition mixed for the desired time or to a particular temperature to achieve adequate dispersion of the ingredients. Alternatively, the rubber and a portion of the carbon black (e.g., one-third to two thirds) is mixed for a short time (e.g., about 1 to 3 minutes) followed by the remainder of the carbon black and oil. Mixing is continued for about 5 to 10 minutes at high rotor speed during which time the mixed components reach a temperature of about 140° C. Following cooling, the components are mixed in a second step on a rubber mill or in a Banbury mixer during which the curing agent and optional accelerators, are thoroughly and uniformly dispersed at relatively low temperature, e.g., about 80 to about 105° C., to avoid premature curing of the composition. Variations in mixing will be readily apparent to those skilled in the art and the present invention is not limited to any specific mixing procedure. The mixing is performed to disperse all components of the composition thoroughly and uniformly.

Innerliner stack is then prepared by calendaring the compounded rubber composition into sheet material having a thickness of roughly 40 to 80 mil gauge and cutting the sheet material into strips of appropriate width and length for innerliner applications.

The sheet stock at this stage of the manufacturing process is a sticky, uncured mass and is therefore subject to deformation and tearing as a consequence of handling and cutting operations associated with tire construction.

A particularly advantageous feature associated with the ester-functionalized interpolymers of the invention is that composition containing same may be partially cured by subjecting the material to high energy radiation.

Accordingly, in another embodiment of the invention, the sheet stock emerging from the calendar rolls is exposed to a source of high energy radiation for a period of time sufficient to partially cure the sheet material such that it exhibits improved resiliency and enhanced resistance to permanent deformation and tearing. Suitable radiation includes ultra violet, electron beam or gamma radiation from such sources as a resonant transformer accelerator, a Van de Graaf electron accelerator, a betatron, a synchrotron, a cyclotron or the like. Radiation from these sources will produce ionizing radiation such as electrons, protons, neutrons, deuterons, gamma rays, X-rays, alpha particles and beta particles. Suitable doses of electron beam radiation may range from about 0.2 megarad to about 20 megarads, preferably from about 1 to 10 megarads. Suitable doses of UV radiation may range from about 0.05 to about 2 $J/cm^2$, preferably from about 0.1 to about 1 $J/cm^2$.

The amount of radiation required for partial cure will vary as a function of the thickness of the sheet stock and its composition. It is important, however, that the time duration and intensity of radiation exposure be sufficient only to partially cure the sheet stock to the point where the handling properties are improved, but insufficient to overcure or vulcanize the sheet stock such that little or no additional crosslinking can take place after the innerliner element is laminated to the tire carcass element and the resulting laminate subjected to vulcanization conditions.

The innerliner is then ready for use as an element in the construction of a pneumatic tire. The pneumatic tire is composed of a layered laminate comprising an outer surface which includes the tread and sidewall elements, an intermediate carcass layer which comprises a number of plies containing tire reinforcing fibers, (e.g., rayon, polyester, nylon or metal fibers) embedded in a rubbery matrix and an innerliner layer which is laminated to the inner surface of the carcass layer. Tires are normally built on a tire forming drum using the layers described above. After the uncured tire has been built on the drum, the uncured tire is placed in a heated mold having an inflatable tire shaping bladder to shape it and heat it to vulcanization temperatures by methods well known in the art. Vulcanization temperatures generally range from about 100° C. to about 250° C., more preferably from 150° C. to 200° C., and times may range from about one minute to several hours, more preferably from about 5 to 30 minutes. Vulcanization of the assembled tire results in vulcanization of all elements of the tire assembly, i.e., the innerliner, the carcass and the outer tread/widewall layers and enhances the adhesion between these elements, resulting in a cured, unitary tire from the multi-layers.

The tire innerliner composition of the present invention may be used in producing innerliners for motor vehicle tires such as truck tires, bus tires, passenger automobile, motorcycle tires, off the road tires, and the like. The improved heat aging resistance of the present innerliner composition makes it particularly suited for use in truck tires to increase the retreading capability of the tire.

The following examples are illustrative of the invention. The materials used in the examples were as follows:

| | |
|---|---|
| MA-IPMS | An interpolymer as prepared in Example A and containing about 97.5 mole % isobutylene, 1.8 mole % of unsubstituted para-methylstyrene, about 0.33 mole % of the 4-(methacrylic acid - methyl) ester of styrene and 0.05 mole % of benzophenone which functions as an internal stabilizer. |
| FLEXON ™ 876 | Paraffinic processing oil from Exxon Chemical Co. |
| STRUKTOL ™ 40MS | Asphaltene fatty acid processing acid. |
| ESCOREZ ™ 1102 | Hydrocarbon-based resin tackifier. |
| MBTS | 2,2'-mercaptobenzothiazole disulfide |
| HVA-2 | N,N'm-phenylenedimaleimide accelerator. |
| SBR | Solution polymerized copolymer of butadiene and styrene. |
| BROMOBUTYL 2255 | A brominated copolymer of isobutylene and isoprene containing 2 mole % isoprene and 2 wt % bromine. |
| CHLOROBUTYL 1068 | A chlorinated copolymer of isobutylene and isoprene containing 1.7 mole % isoprene and 1.2 wt % chlorine. |
| FEF - N550 | Reinforcing carbon black |
| GPF - N660 | Reinforcing carbon black |
| DDBPH | Dimethyl di-t-butyl peroxy hexane. |

EXAMPLE A

A 5000 mL glass-jacketed reaction vessel fitted with an overhead stirrer, a hose connector and a septum was purged with nitrogen. At room temperature under nitrogen, the vessel was charged with toluene (3100 mL) and 475 g of the base isobutylene/para-methylstyrene/para-bromomethylstyrene terpolymer comprising 2.4 mole percent total para-methylstyrene, including 1.05 mole percent para-bromomethylstyrene, and having a Mooney viscosity of 65 (1+8 min., 125° C.). The base terpolymer was dissolved by stirring at room temperature overnight. A tetrabutylammonium salt of methacrylic acid was prepared in a second flask by charging 123.6 mL tetrabutylammonium hydroxide (1.0M in methanol) 110 m tool methacrylic acid, 5.15 m mol 4-hydroxy-benzophenone and 100 mL isopropanol (IPA) to the flask and swirling the contents of the flask at room temperature, giving a water-white clear solution. This solution was then added to the flask containing the dissolved base terpolymer, at a circulating bath temperature of 83° C. After 45 minutes, the bath temperature was raised to 95° C. and let to run for 7.5 h. Then the bath temperature was lowered to 70° C., and after a 2.5 h period, the reaction was let to cool. The yellowish viscous solution was quenched and washed with 10 mL HCl in 1000 mL distilled water, and subsequently washed with $H_2O$/IPA (70:30) 5 to 6 times. The polymer was isolated by precipitation into isopropanol and dried in vacuo for 48 h at 1 mm Hg and 80° C. Solution viscosity of the recovered material was identical to the starting material, and $^1$HNMR (400 MHz, $CDCl_3$) analysis of the functionalized polymer indicated quantative conversion of the benzyl bromide. The results of NMR analysis show about 0.33 to 0.35 mole % of methacrylate and 0.05 mole % benzophenone functionality in the polymer.

Examples 1-8

Innerliner stock formulations having the composition shown in Table 1 were prepared by forming an intimate mixture of all ingredients except for the curatives in a Banbury mixer. The compounded stock was dumped from the Banbury at 150° C. and the curatives were then added and mixing continued for about 10 minutes at about 100° C. on a two roll mill. Two control formulations were also prepared in this manner, Control A containing bromobutyl rubber and Control B containing chlorobutyl rubber.

The physical properties of the press cured formulations for each example and the control formulations are shown in Table 1. These properties were evaluated in accordance with ASTM-D-412.

Peel adhesion to a conventional general purpose rubber carcass stock was also measured. The carcass stock used contained a mixture of 50 parts natural rubber, 25 parts polybutadiene and 25 parts SBR and contained 50 parts of carbon black and a conventional accelerated sulfur curing system. Peel adhesion was evaluated by laminating a strip of each formulation type to a strip of the carcass stock, curing to laminate in a press and then measuring the adhesive strength using an Instron machine. Test adhesion results for the compositions of Examples 1–8 compare favorably with those obtained with Chloro or Bromo-butyrubbers.

Accordingly, the compositions of the present invention provide effective innerliner materials which are essentially free of halogen.

| | EX 1 | EX 2 | EX 3 | EX 4 | EX 5 | EX 6 | EX 7 | EX 8 | CONT A | CONT B |
|---|---|---|---|---|---|---|---|---|---|---|
| Ingredients | | | | | | | | | | |
| MA-IPMS | 100 | 100 | 100 | 80 | 80 | 80 | 80 | 80 | — | — |
| SBR | — | — | — | 20 | 20 | 20 | 20 | 20 | — | — |
| BROMOBUTYL 2255 | — | — | — | — | — | — | — | — | 100 | — |
| CHLOROBUTYL 1068 | — | — | — | — | — | — | — | — | — | 100 |
| FLEXON 876 | 8 | 8 | 8 | 8 | 8 | 8 | 8 | 8 | 8 | 8 |
| ESCOREZ 1102 | 4 | 4 | 4 | 4 | 4 | 4 | 4 | 4 | 4 | 4 |
| STRUKTOL 40 MS | 7 | 7 | 7 | 7 | 7 | 7 | 7 | 7 | 7 | 7 |

-continued

|  | EX 1 | EX 2 | EX 3 | EX 4 | EX 5 | EX 6 | EX 7 | EX 8 | CONT A | CONT B |
|---|---|---|---|---|---|---|---|---|---|---|
| FEF-N550 | 50 | 50 | 50 | 50 | 50 | 50 | 50 | 50 | — | — |
| GPF-N660 | — | — | — | — | — | — | — | — | 50 | 50 |
| MgO | — | — | — | — | — | — | — | — | 0.2 | 0.2 |
| Stearic acid | 1 | 1 | 1 | 1 | 1 | 1 | 1 | 1 | 2 | 2 |
| Curatives |  |  |  |  |  |  |  |  |  |  |
| DDBPH | 4 | 4 | — | 4 | 4 | — | 1 | 1 | — | — |
| Di-Cumyl Peroxide | — | — | 2 | — | — | 2 | — | — | — | — |
| ZnO | 3 | 3 | 3 | 3 | 3 | 3 | 3 | 3 | 3 | 3 |
| MBTS | — | — | — | — | — | — | — | — | 1.5 | 1.5 |
| HVA-2 | — | — | 1 | — | — | 1 | — | — | — | — |
| Phys. Prop. Press Cure @ 180° C. (mins.) | 8 min | 8 min | 8 min | 8 min | 8 min | 8 min | 8 min | 8 min | 10 min | 15 min |
| Shore A Hardness | 35 | 31 | 40 | 52 | 46 | 47 | 39 | 36 | 35 | 34 |
| 100% Mod., MPa | 0.8 | 0.7 | 1.0 | 2.7 | 1.5 | 1.9 | 1.1 | 0.9 | 0.8 | 0.8 |
| 300% Mod., MPa | 3.1 | 2.4 | 4.2 | — | 6.1 | 7.4 | 4.6 | 3.4 | 2.8 | 2.6 |
| Tensile Strength, MPa | 9.0 | 9.3 | 9.01 | 8.2 | 9.3 | 8.0 | 10.8 | 11.5 | 10.6 | 9.9 |
| Elongation @ Break % | 710 | 825 | 605 | 240 | 420 | 320 | 565 | 730 | 820 | 860 |
| Peel Adhesion Pres Cure @ 180° C. (mins.) | 12 min | 12 min | 12 min | 12 min | 12 min | 12 min | 12 min | 14 min | 14 min | 20 min |
| Average of 2 measurements (KN/m) | 4 | 3.7 | 2.5 | 5.5 | 5.85 | 4.2 | 5.5 | 6.0 | 6.7 | 7.3 |
| Type of failure I = Interfac. Failure P = Pluck type failure | I | I | I | I | I | I | P | P | I | I |

What is claimed is:

1. A vulcanizable tire innerliner composition comprising a mixture of:

i) from about 40 to 80 weight percent of an elastomeric random interpolymer essentially free of halogen comprising at least about 80 wt % of a polymerized isomonoolefin containing from 4 to 7 carbon atoms and from about 0.05 up to about 20 wt % of copolymerized aromatic monomer units comprising a mixture of the following structures randomly distributed therein:

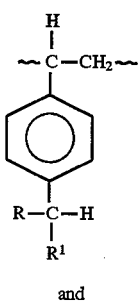

(a)

and

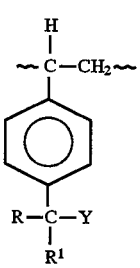

(b)

wherein R and $R^1$ are independently selected from the group consisting of hydrogen and $C_1$ to $C_4$ alkyl and Y comprises an ester group represented by the structure:

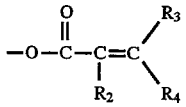

wherein $R_2$ and $R_3$ are independently selected from the group consisting of hydrogen and an alkyl group containing 1 to about 6 carbon atoms and $R_4$ is selected from the group consisting of hydrogen, an alkyl group containing from 1 to about 28 carbon atoms, an aryl group and an alkenyl group containing from 2 to about 28 carbon atoms;

ii) from about 20 to about 45 wt % of a filler, iii) from 0 to about 25 wt % of a plasticizer oil; and iv) at least 1 wt % of a curing system for said interpolymer.

2. The composition of claim 1 wherein $R_2$ is hydrogen or methyl.

3. The composition of claim 2 wherein $R_3$ is hydrogen.

4. The composition of claim 3 wherein $R_4$ is hydrogen or $C_3$ or $C_{12}$ alkenyl.

5. The composition of claim 4 wherein $R_4$ is hydrogen.

6. The composition of claim 1 wherein said interpolymer contains from about 0.1 to about 5 mole % of said (b) monomer units.

7. The composition of claim 1 wherein R and $R^1$ are each hydrogen.

8. The composition of claim 7 wherein said polymerized isomonoolefin is isobutylene.

9. The composition of claim 1 wherein said filler is reinforcing grade carbon black.

10. The composition of claim 1 containing at least about 5 wt % of said plasticizer oil.

11. The composition of claim 1 wherein said curing system comprises accelerated sulfur curing agents.

12. The composition of claim 1 wherein said curing system comprises at least one organic peroxide.

13. The composition of claim 1 wherein said curing system comprises zinc oxide.

14. A vulcanizable tire innerliner composition comprising a mixture of:
i) a blend of
(A) from about 40 to 80 wt % of an elastomeric random interpolymer essentially free of halogen, comprising at least 80 wt % of a polymerized isomonoolefin containing from 4 to 7 carbon atoms and from about 0.05 up to about 20 wt % of copolymerized aromatic monomer units comprising a mixture of the following structures randomly distributed therein:

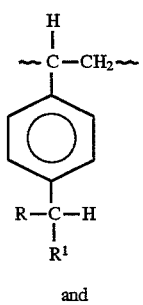

and

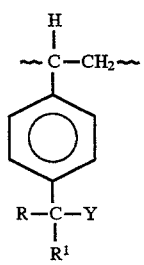

wherein R and $R^1$ are independently selected from the group consisting of hydrogen and $C_1$ to $C_4$ alkyl and Y comprises an ester group represented by the structure:

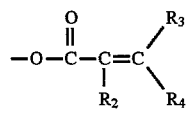

wherein $R_2$ and $R_3$ are independently selected from the group consisting of hydrogen and an alkyl group containing 1 to about 6 carbon atoms and $R_4$ is selected from the group consisting of hydrogen, an alkyl group containing from 1 to about 28 carbon atoms, an aryl group and an alkenyl group containing from 2 to about 28 carbon atoms; and
(B) one or a mixture of unsaturated rubbers selected from the group consisting of natural rubber, polyisoprene, polybutadiene, butyl rubber, halogenated butyl rubber, and copolymers of butadiene with up to about 35 wt % of styrene or acrylonitrile;
ii) from about 20 to about 45 wt % of a filler,
iii) from 0 to about 25 wt % of a plasticizer oil; and
iv) at least 1 wt % of a curing system for said interpolymer.

15. A pneumatic tire comprising an outer tread and sidewall portion, an inner carcass portion adhered to said tread sidewall portion and an innerliner sheet adhered to the inner surface of said carcass portion, said innerliner having the composition of claim 1.

16. A vulcanized composition prepared by heating the composition of claim 1 at a temperature of from about 100° C. to about 250° C. for a period of time sufficient to vulcanize said composition.

17. A vulcanized pneumatic tire prepared by heating the tire structure of claim 15 at a temperature of from about 100° C. to about 250° C. for a period of time sufficient to vulcanize said tire.

18. A process for fabricating a pneumatic tire comprised of a carcass element containing an unsaturated rubber and an innerliner element adhered to said carcass element comprising:
a. forming a composition comprising a mixture of:
i) a blend of
(A) from about 40 to 80 wt % of an elastomeric random interpolymer essentially free of halogen, comprising at least 80 wt % of a polymerized isomonoolefin containing from 4 to 7 carbon atoms and from about 0.05 up to about 20 wt % of copolymerized aromatic monomer units comprising a mixture of the following structures randomly distributed therein:

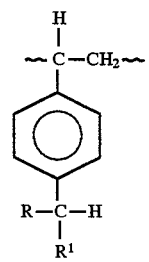

and

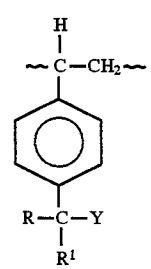

wherein R and $R^1$ are independently selected from the group consisting of hydrogen and $C_1$ to $C_4$ alkyl and Y comprises an ester group represented by the structure:

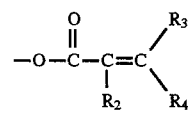

wherein $R_2$ and $R_3$ are independently selected from the group consisting of hydrogen and an alkyl group containing 1 to about 6 carbon atoms and $R_4$ is selected from the group consisting of hydrogen, an alkyl group containing from 1 to about 28 carbon atoms, an aryl group and an alkenyl group containing from 2 to about 28 carbon atoms; and (B) up to 50 wt % based on the rubber content of said composition, of one or a mixture of unsaturated rubbers selected from the group consisting of natural rubber, polyisoprene, polybutadiene, butyl rubber, halogenated butyl rubber, and copolymers of butadiene with up to about 35 wt % of styrene or acrylonitrile;

ii) from about 20 to about 45 wt % of a filler,
iii) from 0 to about 25 wt % of a plasticizer oil; and
iv) at least 1 wt % of a curing system for said interpolymer into an innerliner sheet material;

b. exposing said sheet material to a source of high energy radiation sufficient to partially cure said sheet material;

c. contacting said partially cured innerliner sheet material with said tire carcass element to form a laminated structure; and d. heating said structure at a temperature of from about 100° to 250° C. for a period of time sufficient to vulcanize said structure.

* * * * *